United States Patent
Bérat

(10) Patent No.: US 12,379,997 B2
(45) Date of Patent: Aug. 5, 2025

(54) DETECTING AN ERROR IN AN UPDATED SOFTWARE PACKAGE BY AUTOMATICALLY REBUILDING RELATED DOWNSTREAM PRODUCTS

(71) Applicant: Red Hat, Inc., Raleigh, NC (US)

(72) Inventor: Frédéric Bérat, St. Etienne de Tulmont (FR)

(73) Assignee: Red Hat, Inc., Raleigh, NC (US)

( * ) Notice: Subject to any disclaimer, the term of this patent is extended or adjusted under 35 U.S.C. 154(b) by 218 days.

(21) Appl. No.: 18/219,935

(22) Filed: Jul. 10, 2023

(65) Prior Publication Data

US 2025/0021438 A1    Jan. 16, 2025

(51) Int. Cl.
G06F 11/14 (2006.01)
G06F 8/41 (2018.01)
G06F 8/65 (2018.01)
G06F 8/71 (2018.01)
G06F 11/3668 (2025.01)

(52) U.S. Cl.
CPC .......... *G06F 11/1433* (2013.01); *G06F 8/433* (2013.01); *G06F 8/65* (2013.01); *G06F 8/71* (2013.01); *G06F 11/1479* (2013.01); *G06F 11/3688* (2013.01); *G06F 11/3692* (2013.01)

(58) Field of Classification Search
CPC ............. G06F 11/1433; G06F 11/1479; G06F 11/3688; G06F 11/3692; G06F 8/41; G06F 8/433; G06F 8/447; G06F 8/60–66; G06F 8/71
See application file for complete search history.

(56) References Cited

U.S. PATENT DOCUMENTS

| | | | |
|---|---|---|---|
| 2016/0034270 | A1 | 2/2016 | Stanislaw et al. |
| 2016/0098265 | A1* | 4/2016 | Mahajan .......... G06F 8/71 717/170 |
| 2019/0146772 | A1 | 5/2019 | Leigh et al. |

(Continued)

OTHER PUBLICATIONS

Auto rebuild of dependent packages?, Homebrew discussion #44, Oct. 2020, 3 pages, [retrieved on Apr. 3, 2025], Retrieved from the Internet: <URL:https://github.com/orgs/Homebrew/discussions/44>.*

(Continued)

*Primary Examiner* — Geoffrey R St Leger
(74) *Attorney, Agent, or Firm* — Kilpatrick Townsend & Stockton LLP

(57) ABSTRACT

An error can be detected in an updated software package by automatically rebuilding related downstream products. For example, a system can determine that a downstream product depends on an updated software package. Based on making this determination, the system can initiate a first rebuild process on the downstream product using the updated software package. If the first rebuild process fails, the system can initiate a second rebuild process on the downstream product using a prior version of the updated software package. The prior version can exclude at least one update made in the updated software package. If the second rebuild process succeeds, based on detecting that the first rebuild process failed and the second rebuild process succeeded, the system can generate an output for a user. The output can indicate that the updated software package is flawed.

20 Claims, 6 Drawing Sheets

(56) References Cited

U.S. PATENT DOCUMENTS

| | | |
|---|---|---|
| 2019/0294528 A1 | 9/2019 | Yaron et al. |
| 2020/0125358 A1 | 4/2020 | Ross et al. |
| 2022/0405193 A1 | 12/2022 | Ashok et al. |
| 2023/0091915 A1* | 3/2023 | Chen .................. G06F 8/658 717/168 |

OTHER PUBLICATIONS

Git revert, git revert documentation version 2.34.1, 2021, 3 pages, [retrieved on Apr. 7, 2025], Retrieved from the Internet: <URL: https://web.archive.org/web/20211207215606/https://git-scm.com/docs/git-revert>.*

Fedora, "Tools for launching mass rebuilds in Copr," Gifthub.com, Apr. 18, 2022: pp. 1-3, <https://github.com/fedora-copr/copr-rebuild-tools>.

Gompa, "copr-autorebuilder," Pagure.io, 2019, retrieved May 17, 2023: p. 1, <https://pagure.io/copr-autorebuilder>.

Gosnell, "Find or build all reverse dependencies of a Haskell package using Nix," Gifthub.com, Retrieved May 17, 2023: pp. 1-2, <https://github.com/cdepillabout/nix-reverse-deps-of-haskell-package>.

Prakash, "How to Check Dependencies of a Package in Ubuntu/Debian-based Linux Distributions," It's FOSS, Jan. 11, 2023: pp. 1-11, <https://itsfoss.com/check-dependencies-package-ubuntu/>.

European Search Report, 23209918.4, May 2, 2024, 10 pages.

* cited by examiner

DETECTING AN ERROR IN AN UPDATED SOFTWARE PACKAGE BY AUTOMATICALLY REBUILDING RELATED DOWNSTREAM PRODUCTS

TECHNICAL FIELD

The present disclosure relates generally to software development. More specifically, but not by way of limitation, this disclosure relates to detecting errors in an updated software package by automatically rebuilding downstream products that depend on the software package.

BACKGROUND

A software developer can create a software package that includes a group of computer programs provided as a bundle. After initially releasing the software package, the software developer can update the software package. The update can be designed to resolve bugs, improve security, add new functionality, or remove existing functionality. Before the updated software package is released to end users, the software developer may perform various software tests (e.g., unit tests, integration tests, and system tests) on the updated software package to help ensure that the update is free from defects or meets other requirements. Once the software developer is satisfied that the updated software package is ready for release, the software developer may push the updated software package to an update server or otherwise make the updated software package available to the end users. The end users may then download the updated software package for subsequent use.

DETAILED DESCRIPTION

Figure 1:
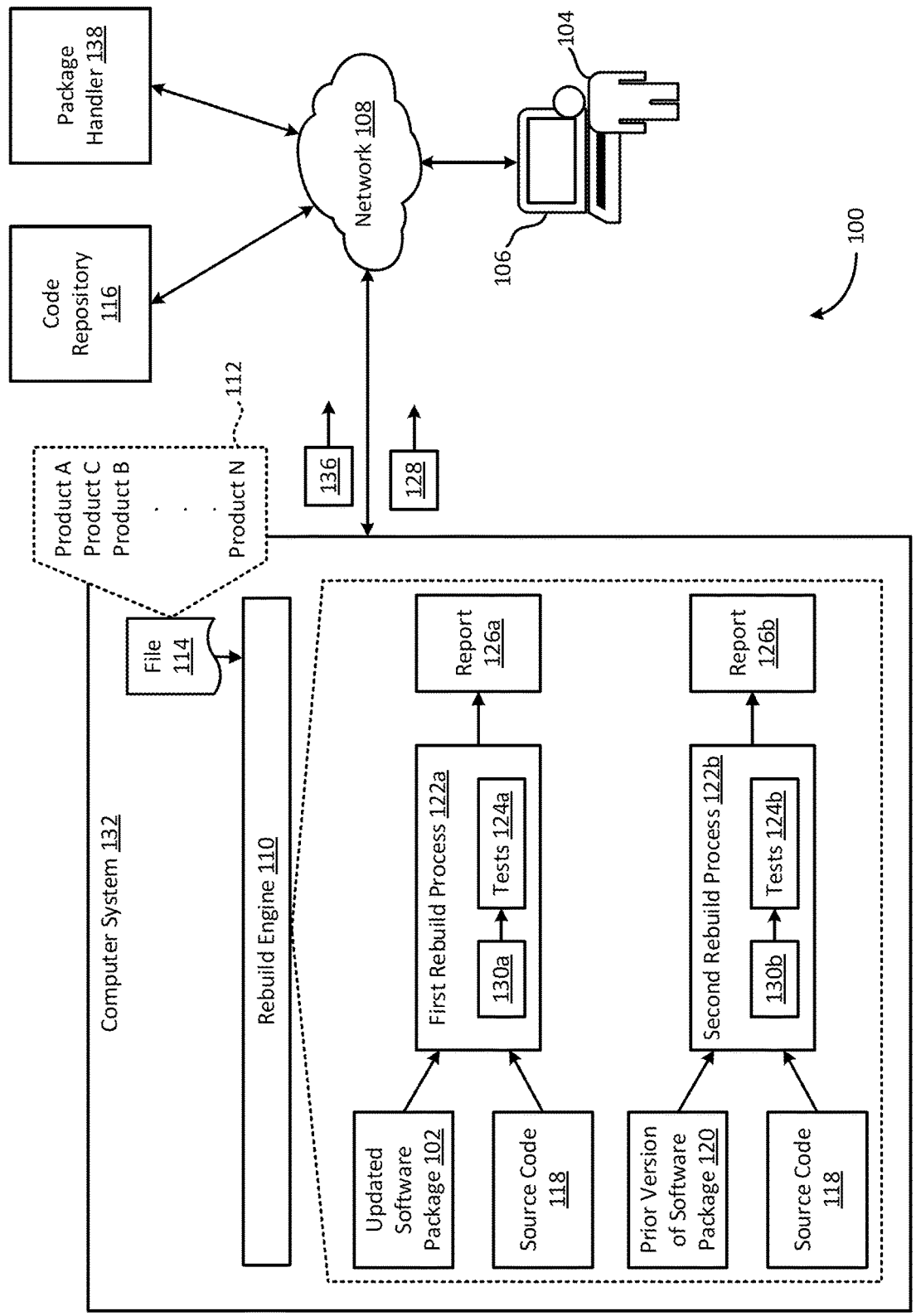
FIG. 1 is a block diagram of an example of a system for detecting errors in an updated software package according to some aspects of the present disclosure.

After initially releasing a software package (e.g., an RPM package), a software developer may update the software package. For example, the software developer can modify the source code of the software package to include one or more updates that are absent from a prior version of the software package. The software developer may then perform one or more software tests on the updated software package for debugging purposes. If the updated software package passes the software tests, the software developer may release the updated software package for use by other developers in various downstream products. The downstream products can directly or indirectly depend on the software package (e.g., either the updated version or a prior version). For example, if the software package is a library, the downstream products can be software packages that depend on any version of the library. This dependency may be hardcoded into the downstream products, for example through "include" directives in their source code.

It is common for hundreds or thousands of downstream products to depend on the same software package. Thus, when a software developer updates a software package, it has the potential to impact the functionality of a large number of downstream products. Even though the software developer may test the updated software package prior to its release to minimize bugs, it is normally impossible to predict how the updated software package will interact with all of the downstream products when its actually integrated into those downstream products. As a result, there are many situations where an updated software package still negatively impacts downstream products, even though the updated software package passed all of its tests. For example, the downstream product may rely on a feature that is deprecated in the updated software package. As another example, the updated software package may pass new or different arguments that are incompatible with the downstream product. As still another example, the updated software package may return values that are no longer compatible with the downstream product. In each of these scenarios, the updated software package may pass all of its software tests but still produce errors in the downstream product.

Some examples of the present disclosure can overcome one or more of the abovementioned problems by providing a testing system that can automatically detect errors in downstream products resulting from an updated software package, before the update is released to end users. For example, the testing system can determine which downstream products depend on the updated software package. The testing system can then automatically rebuild some or all of the downstream products using the updated software package. By rebuilding the downstream products using the updated software package, the testing system can preemptively determine the impact of the update on the downstream products, before the update is released. If the testing system determines that the update would negatively impact a downstream product (e.g., the update would produce a bug in the downstream product), suitable remedial measures can be taken. In this way, the testing system can help a software developer quickly and easily identify and resolve latent bugs arising from the update, before the update is released to end users.

More specifically, the testing system can execute a rebuild process on each downstream product using the updated software package. During the rebuild process for a downstream product, the testing system can perform one or more tests to verify that no bugs have been introduced as a result of the update to the software package. If all of the rebuilt downstream products pass their tests, there are likely no errors in the updated software package. On the other hand, if a rebuilt downstream product fails a test, the testing system can automatically perform further operations to determine whether the failed test is due to the update or something else. For example, the testing system can attempt to rebuild the downstream product again, this time using a prior version of the software package that excludes the update. If this second rebuild process succeeds, then the testing system can determine that a root cause (e.g., origin) of the failed test is a problem in the update. The test system can then notify the software developer about the problem. This can allow the developer to take any necessary remedial action, like modifying the source code of the update to correct whatever bug produced the failed test. Through the above process, the testing system can automatically assess the impact of an updated software package on a large number of dependent downstream products, so that any bugs can be resolved preemptively before the update is formally released.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for detecting errors in an updated software package 102 according to some aspects of the present disclosure. The system 100 can include a computer system 132. The computer system 132 can include any number and combination of computing nodes (e.g., physical or virtual machines). In some examples, the computer system 132 can be a distributed computing environment formed from multiple networked computing nodes. Some examples of such a distributed computing environment can include a cloud computing environment, a data grid, or a computing cluster.

A developer 104 can interact with the computer system 132 to provide an updated software package 102 to the computer system 132. For example, the developer 104 may create the updated software package 102 on a client device 106, such as a laptop computer, desktop computer, mobile phone, or server. To create the updated software package 102, the developer 104 may modify the existing source code associated with the software package 102 to update at least a portion of the source code. The developer 104 may then operate the client device 106 to upload the updated software package 102 to the computer system 132 via one or more networks 108, such as the Internet.

In some examples, prior to uploading the updated software package 102 to the computer system 132, the developer 104 may test the updated software package 102 for defects such as bugs. This initial set of tests can be more about detecting defects in the updated software package 102 itself, independently of any downstream products, rather than detecting unwanted side effects from integrating the updated software package 102 with downstream products. For example, the developer 104 can execute testing software on the client device 106 to perform software tests (e.g., units tests and integration tests) on the updated software package 102. Additionally, or alternatively, the developer 104 can upload the updated software package 102 to the computer system 132, which can execute the testing software to perform at least some of the software tests. If any defects are flagged at this stage, the developer 104 can modify the update to resolve the defects.

After completing this initial testing of the updated software package 102, the developer 104 may interact with the computer system 132 to trigger a rebuild engine 110. For example, the developer 104 can interact with a graphical user interface provided by the computer system 132 to trigger the rebuild engine 110. The rebuild engine 110 can perform more comprehensive testing to detect integration problems between the updated software package 102 and one or more downstream products.

More specifically, the rebuild engine 110 can identify a set of downstream products 112 that rely on the software package (e.g., the updated version 102 or a prior version of the software package). In some examples, the rebuild engine 110 can determine the set of downstream products 112 from a predefined file 114. The file 114 may be created by the developer 104 or another entity. The file 114 can list the set of downstream products 112 that depend on the software package. For instance, the file 114 can list unique identifiers of the downstream products 112, such as their names. In other examples, the rebuild engine 110 can automatically identify the set of downstream products 112 that rely on the software package. The rebuild engine 110 may automatically identify the set of downstream products 112 by communicating with a package handler 138, which may be internal or external to the computer system 132. The package handler 138 can return a list of the downstream products in response to a request 136 for said list. An example of such an automated process is described in greater detail later on with respect to FIG. 3. Either way, the rebuild engine 110 can determine which downstream products 112 rely on the software package.

After determining which downstream products 112 rely on the software package, the rebuild engine 110 can obtain their source code. The rebuild engine 110 can automatically obtain the source code for each downstream product 112 from one or more code repositories 116. In some examples, the code repositories 116 may be part of a version control system for source code, such as GitHub®. If the computer system 132 does not already contain the source code for a given downstream product 112, the computer system 132 can download the source code from the code repositories 116. In some examples, the computer system 132 can determine a location from which to download the source code for a given downstream product 122 from the file 114, which may include uniform resource locators (URLs) or other addresses indicating where the source code for each of the downstream products 112 can be found.

After obtaining the source code for the downstream products 112 that rely on the software package 102, the rebuild engine 110 can attempt to rebuild each of the downstream products 112 using their source code and the updated software package 102. For example, the rebuild engine 110 can perform a first rebuild process 122a on a downstream product (e.g., Product A) using source code 118 for the downstream product and the updated software package 102. This can involve generating a binary file 130a based on the source code 118 and the updated software package 102, for example by compiling the source code 118 into the binary file 130a. One or more tests 124a can then be executed on the binary file 130a to detect defects. A report 126a can be generated indicating whether the binary file 130a passed or failed the tests 124a. The report 126a can also include build logs, test logs, or both. If the binary file 130a passed all of the tests 124a, then the rebuild engine 110 can determine that the updated software package 102 does not negatively impact that particular downstream product. If the binary file 130a failed one or more of the tests 124a, then the rebuild engine 110 can perform additional operations to determine a root cause of the failure.

For example, the rebuild engine 110 can obtain a prior version of the software package 120. The prior version of the software package 120 is a previous version of the software package before the update was applied. The prior version 120 may or may not be the most recent version of the software package prior to the update. The rebuild engine 110 can obtain the prior version 120 from one or more repositories, such as the code repositories 116. The rebuild engine 110 can then perform a second rebuild process 122b using the source code 118 for the downstream product and the prior version of the software package 120. This can involve generating a binary file 130b based on the source code 118 and the prior version 120, for example by compiling the source code 118 into the binary file 130*b*. One or more tests 124*b* can then be executed on the binary file 130*b* to detect defects. These tests 124*b* may be the same as the tests 124*a* performed during the first rebuild process 122*a*. A report 126*b* can be generated indicating whether the binary file 130*b* passed or failed the tests 124*b*. The report 126*b* can also include build logs, test logs, or both. If the binary file 130*b* passed all of the tests 124*b*, then the rebuild engine 110 can determine that the problem stems from the update to the software package. So, the rebuild engine 110 can transmit an output 128 to the developer 104 that indicates the problem and that its root cause is related to the update. The output 128 may also include at least some of the reports 124*a*, 126*b*, such as their build logs and/or test logs, which can be used to help the developer 104 further narrow down the root cause of the problem. Conversely, if the binary file 130*b* failed one or more of the tests 124*b* (e.g., the same tests that were failed during the first rebuild process 122*a*), then it may be harder to discern the root cause of the problem—the root cause could be the update to the software package, a defect in the downstream product, or something else. So, the rebuild engine 110 can transmit an output 128 to the developer 104 that indicates the problem and that its root cause cannot be determined by the rebuild engine 110. The output 128 may also include at least some of the reports 124*a*, 126*b*, such as their build logs and/or test logs, which can be used to help the developer 104 further narrow down the root cause of the problem.

The rebuild engine 110 can iterate the above process for some or all of the downstream products 112 to assess the update's impact on their functionality and notify the developer 104 of any problems. This can allow the developer 104 to take remedial action, such as modifying the update to resolve any downstream bugs, before the update is formally released to the public. Through this preemptive process, a significant number of problems in the downstream products 112 can be avoided.

Figure 2A:
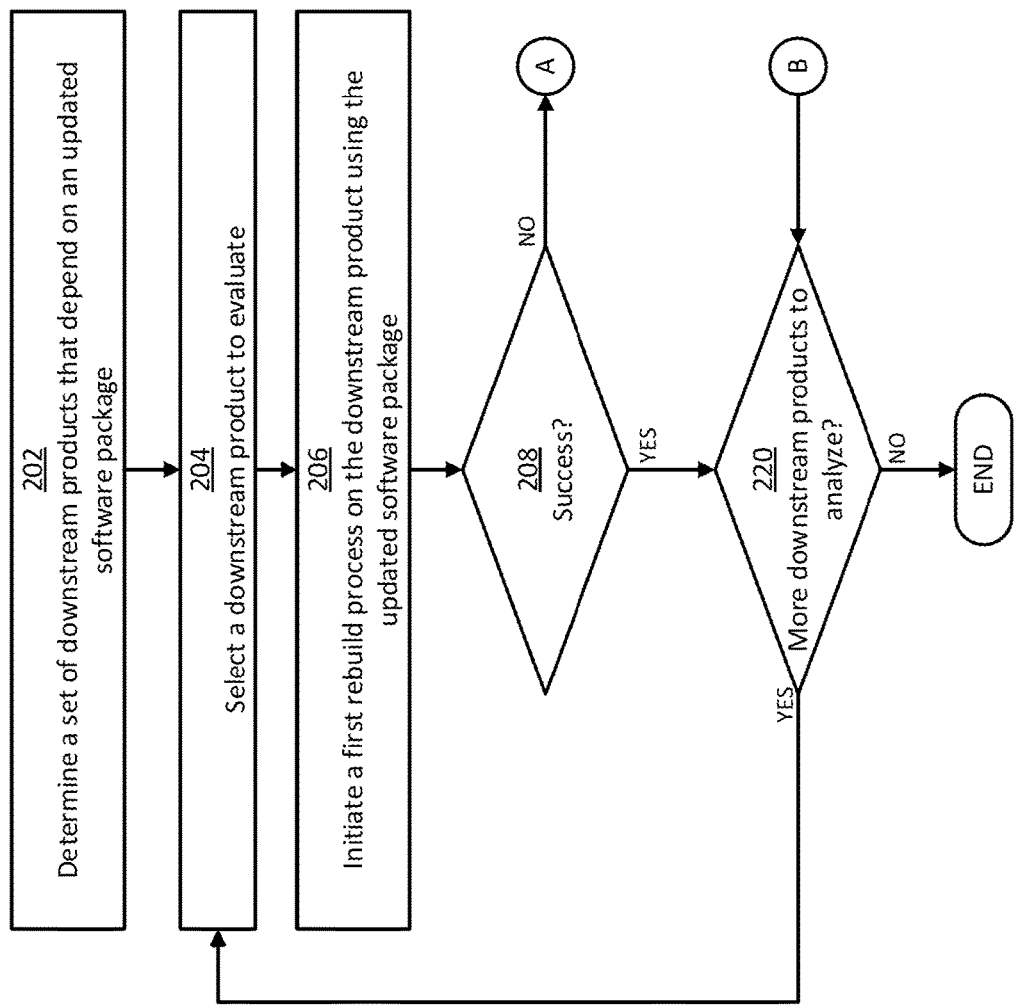
FIGS. 2A-B are flowcharts of an example of a process for detecting errors in an updated software package according to some aspects of the present disclosure.
Figure 2B:
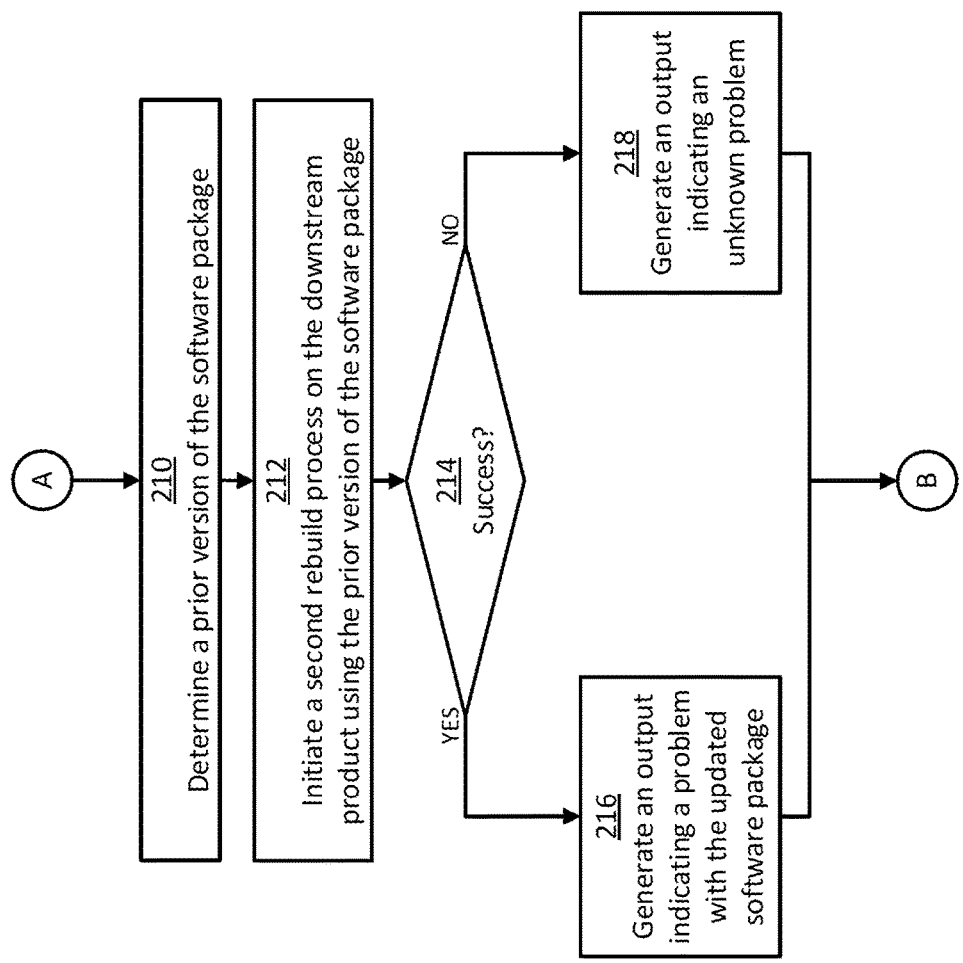

FIGS. 2A-B are flowcharts of an example of a process for detecting errors in an updated software package according to some aspects of the present disclosure. Other examples may include more operations, fewer operations, different operations, or a different sequence of operations than is shown in these figures. The operations of FIGS. 2A-B are described below with reference to the components of FIG. 1.

In block 202, a computer system 132 (e.g., the rebuild engine 110) determines a set of downstream products 112 that depend on an updated software package. For example, the computer system 132 can open a file 114 and extract this information from the file 114. Alternatively, the computer system 132 can automatically determine the set of downstream products 112, as described in greater detail later on.

In block 204, the computer system 132 selects a downstream product (e.g., Product A) to evaluate. For example, the computer system 132 can randomly select a downstream product to evaluate from the set of downstream products 112. Alternatively, the computer system 132 can select a downstream product to evaluate based on one or more factors, such as the downstream product's name (e.g., downstream products can be evaluated in alphabetical order by name) or a predefined evaluation sequence. For instance, in some situations, the set of downstream products may need to be evaluated in a particular sequence to prevent conflicts or other problems. In those situations, the computer system 132 can determine the particular sequence in which to evaluate the downstream products. To do so, the computer system 132 may reference a predefined file 114 that specifies the sequence. After determining the particular sequence, the computer system 132 can then evaluate downstream products in accordance with that particular sequence.

In block 206, the computer system 132 initiates a first rebuild process 122*a* on the downstream product using the updated software package 102. In some examples, the computer system 132 can use a build tool to perform the first rebuild process 122*a*. The build tool may be internal or external to the computer system 132. If the build tool is external to the computer system 132, the computer system 132 can initiate the first build process 122*a* by transmitting a command to the build tool via one or more networks 108.

The build tool can generate a binary file 130*a* based on source code 118 for the downstream product and the updated software package 102. This may involve compiling the source code 118 into the binary file 130*a*. The build tool can then execute one or more tests 124*a* on the binary file 130*a* to detect defects. Depending on the results of the tests 124*a*, the build tool can generate a report 126*a* indicating whether the binary file 130*a* passed or failed the tests 124*a*. The report 126*a* can be accessible to the computer system 132. For example, the build tool can transmit the report 126*a* to the computer system 132.

In block 208, the computer system 132 determines whether the first rebuild process 122*a* was successful. The first rebuild process 122*a* can be considered successful if the binary file 130*a* passed at least a threshold number (e.g., all) of the tests 124*a*. Otherwise, the first rebuild process 122*a* can be considered a failure. The computer system 132 can determine whether the first rebuild process 122*a* was successful based on the report 126*a*.

If the first rebuild process 122*a* was successful, then the process can continue to block 220. In block 220, the computer system 132 determines whether there are any more downstream products to analyze in the set of downstream products determined. If not, the process can end. Otherwise, the process can return to block 204, at which point another downstream product can be selected for evaluation and the process can repeat.

If the first rebuild process 122*a* was unsuccessful, then the process can continue to block 210 of FIG. 2B. In block 210, the computer system 132 determines a prior version of the software package 120. The prior version of the software package 120 may be the most recent version prior to the update. The computer system 132 may identify the prior version by interacting with a version control system, such as GitHub®.

In block 212, the computer system 132 initiates a second rebuild process 122*b* on the downstream product using the prior version of the software package 120. In some examples, the computer system 132 can use a build tool to perform the second rebuild process 122*b*. As noted above, the build tool may be internal or external to the computer system 132. If the build tool is external to the computer system 132, the computer system 132 can initiate the second build process 122*b* by transmitting a command to the build tool via the one or more networks 108.

The build tool can generate another binary file 130*b* based on source code 118 for the downstream product and the prior version of the software package 120. This may involve compiling the source code 118 into the binary file 130*b*. The build tool can then execute one or more tests 124*b* on the binary file 130*b* to detect defects. Depending on the results of the tests 124*b*, the build tool can generate a report 126*b* indicating whether the binary file 130*b* passed or failed the tests 124*b*. The report 126*b* can be accessible to the computer system 132. For example, the build tool can transmit the report 126b to the computer system 132.

In block 214, the computer system 132 determines whether the second rebuild process 122b was successful. The second rebuild process 122b can be considered successful if the binary file 130b passed at least a threshold number (e.g., all) of the tests 124b. Otherwise, the second rebuild process 122b can be considered a failure. The computer system 132 can determine whether the second rebuild process 122b was successful based on the report 126b.

If the second rebuild process 122b was successful, the computer system 132 can generate an output 128 that provides details about the problem, such as the name of the downstream product exhibiting the problem and a list of the tests 124a that failed during the first rebuild process 122a. The output 128 can also indicate that the root cause of the problem is the update. Conversely, if the second rebuild process 122b was unsuccessful, the computer system 132 can generate an output 128 that provides details about the problem, such as the name of the downstream product exhibiting the problem and a list of the tests 124a, 124b that failed during one or both of the rebuild processes 122a, 122b. The output 128 can also indicate that a failure reason (e.g., the root cause of the problem) could not be identified. Either way, after generating the output 128, the computer system 132 can transmit the output 128 to the client device 106 for display to the developer 104. This can assist the developer 104 in identifying and resolving defects associated with the updated software package 102.

Because the process shown in FIGS. 2A-B can iterate hundreds or thousands of times depending on the number of downstream products in the set, in some examples the computer system 132 may not separately transmit an output 128 about each problematic downstream product to the developer 104, since this could consume significant amounts of bandwidth and overwhelm the developer 104. Instead, the computer system 132 can collect some or all of the outputs from the various iterations into one or more lists, so that this information can be provided in bulk to the developer 104 via a smaller number of communications (e.g., a single communication).

Figure 3:
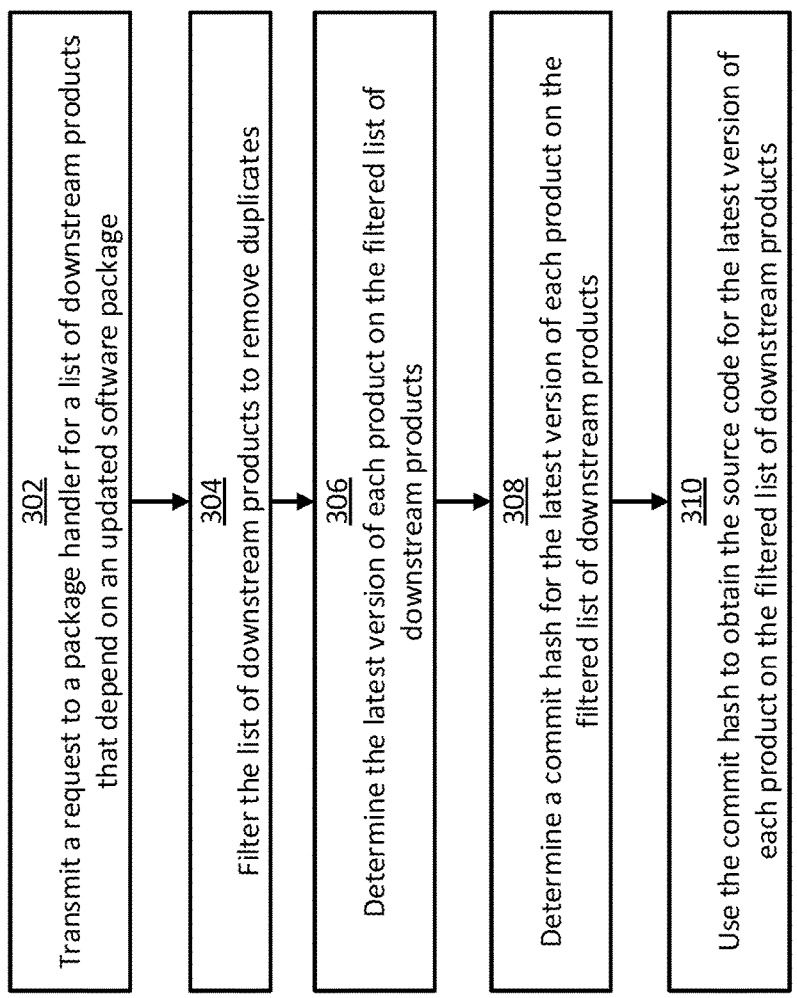
FIG. 3 is a flowchart of an example of a process for identifying downstream software packages and obtaining their source code according to some aspects of the present disclosure.

FIG. 3 is a flowchart of an example of a process for automatically identifying downstream software packages and obtaining their source code according to some aspects of the present disclosure. Other examples may include more operations, fewer operations, different operations, or a different sequence of operations than is shown in this figure. The operations of FIG. 3 are described below with reference to the components of FIG. 1.

In block 302, a computer system 132 (e.g., the rebuild engine 110) transmits a request 136 to a package handler 138 for a list of downstream products that depend on an updated software package 102. The package handler 138 can be a program or a system that tracks relationships between software packages. The package handler 138 may have an API for receiving such requests 136 and providing corresponding responses. The package handler 138 can be configured to return the list of downstream products in response to the request 136. Using this approach, a human may not need to manually generate a file 114 indicating the downstream products.

In block 304, the computer system 132 filters the list of downstream products to remove duplicates. For example, the same downstream product (e.g., the same product and version) may be listed multiple times for various reasons, for example because of direct and indirect dependencies on the updated software package 102. So, the computer system 132 can remove these dependencies to shorten the list, thereby generating a filtered set of downstream products.

In block 306, the computer system 132 determines the latest version of each product on the filtered list of downstream products. For example, the list may contain multiple different versions of the same downstream product. For instance, the list may include v1.9 and v2.0 of the same downstream product. Since the older versions (e.g., v1.9) of the downstream product are outdated, they may not need to be evaluated. So, the computer system 132 may determine which version is the most recent (e.g., v2.0), keep that version on the list, and discard the any older versions from the list. This may further shorten the list.

In block 308, the computer system 132 determines a commit hash for the latest version of each product on the filtered list of downstream products. For example, the computer system 132 can transmit a request to a version control system, which may be internal or external to the computer system 132. The request can be for the commit hash corresponding to the latest version of a particular downstream product on the filtered list of downstream products. In response to receiving the request, the version control system can respond with the commit hash. The computer system 132 can repeat this process for each downstream product on the filtered list of downstream products, to determine a respective commit hash corresponding to the latest version of each product.

In block 310, the computer system 132 uses the commit hash for the latest version of each downstream product to obtain its source code (e.g., from the version control system). For example, the computer system 132 can download the latest version of each downstream product from the version control system using the product's corresponding commit hash. After the computer system 132 has downloaded the source code 118 for a particular downstream product, the computer system 132 can initiate a first rebuild process 122a for that downstream product using the source code 118 and the updated software package 102. The first rebuild process 122a can be implemented as described above.

Figure 4:
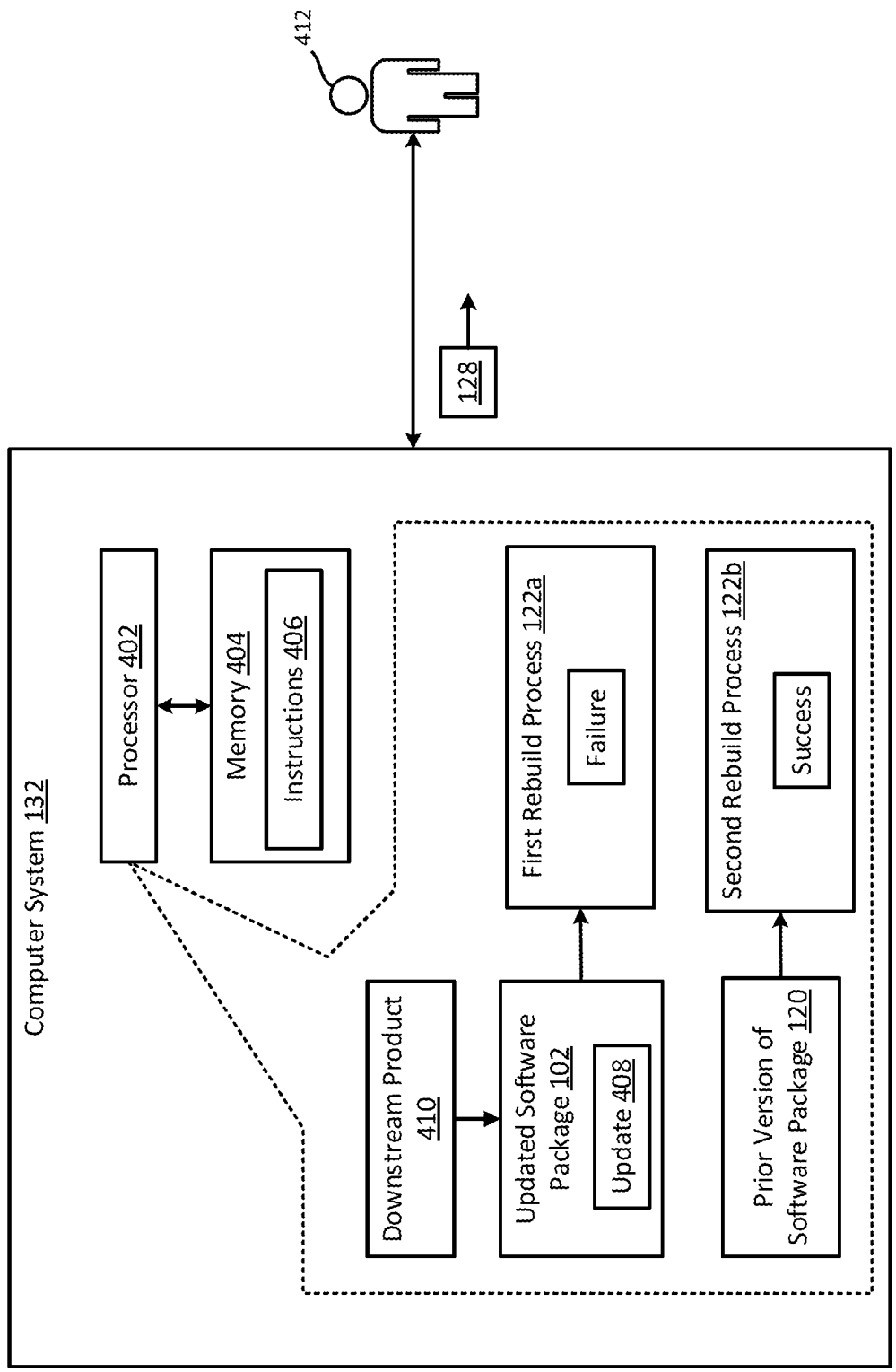
FIG. 4 is a block diagram of a computer system usable to implement some aspects of the present disclosure.

FIG. 4 is a block diagram of a computer system 132 usable to implement some aspects of the present disclosure. The computer system 132 includes a processor 402 communicatively coupled to a memory 404. The processor 402 and memory 404 can be integrated into a single computing device or can be distributed from one another.

The processor 402 can include one processing device or multiple processing devices. Examples of the processor 402 include a Field-Programmable Gate Array (FPGA), an application-specific integrated circuit (ASIC), and a microprocessor. The processor 402 can execute instructions 406 stored in the memory 404 to perform one or more operations. In some examples, the instructions 406 can include processor-specific instructions generated by a compiler or an interpreter from code written in any suitable computer-programming language, such as C, C++, C#, and Java. In some examples, the instructions 406 may correspond to the rebuild engine 110 of FIG. 1.

The memory 404 can include one memory device or multiple memory devices. The memory 404 can be volatile or non-volatile (i.e., the memory 404 can retain stored information when powered off). Examples of the memory 404 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 402 with the instructions 406 or other program code. Examples of a computer-readable medium include magnetic disks, memory chips, ROM, random-access memory (RAM), an ASIC, a configured processor, optical storage, or any other medium from which a computer processor can read the instructions 406.

The processor 402 can execute instructions 406 to perform one or more operations. For example, the processor 402 can determine that a downstream product 410 depends on an updated software package 102. Based on determining that the downstream product 410 depends on the updated software package 102, the processor 402 can initiate a first rebuild process 122a on the downstream product 410 (e.g., its source code) using the updated software package 102. If the first rebuild process 122a fails, the processor 402 can detect that the first rebuild process 122a failed. In response to detecting that the first rebuild process 122a failed, the processor 402 can initiate a second rebuild process 122b on the downstream product 410 using a prior version of the updated software package 120 that excludes at least one update 408 made in the updated software package 102. If the second rebuild process 122b is successful, the processor 402 can detect that the second rebuild process 122b succeeded. Based on detecting that the first rebuild process 122a failed and the second rebuild process 122b succeeded, the processor 402 can generate an output 128 for a user 412 (e.g., a developer associated with the updated software package 102) indicating that the updated software package 102 is flawed. This may allow the user 412 to resolve the flaw, for example prior to the updated software package 102 being released to the general public.

Figure 5:
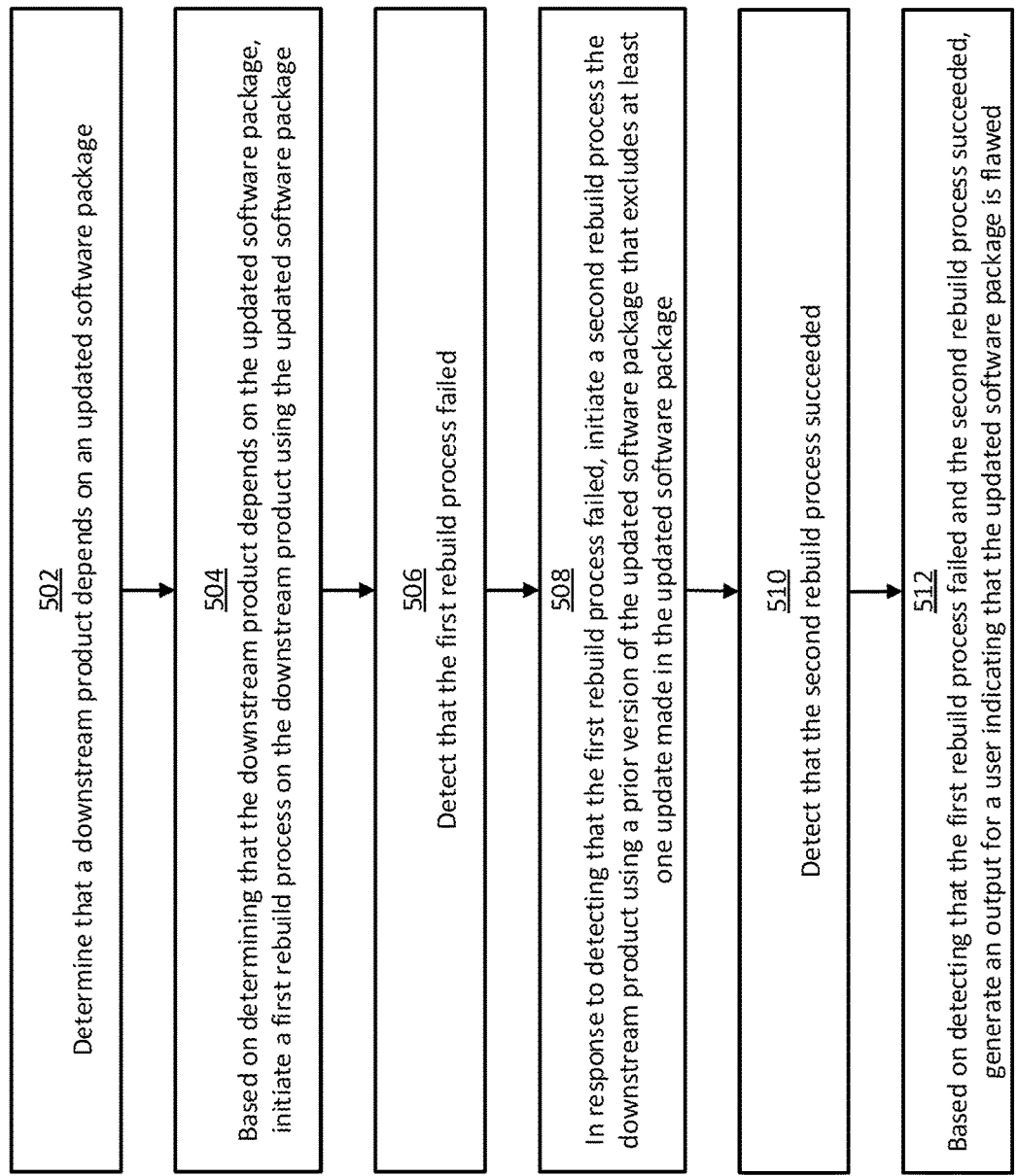
FIG. 5 is a flowchart of an example of a process for detecting errors in an updated software package according to some aspects of the present disclosure.

FIG. 5 is a flowchart of an example of a process for detecting errors in an updated software package according to some aspects of the present disclosure. Other examples may include more operations, fewer operations, different operations, or a different sequence of operations than is shown in this figure. The operations of FIG. 5 are described below with reference to the components of FIGS. 1 and 4.

In block 502, the processor 402 determines that a downstream product 410 depends on an updated software package 102. In some examples, the processor 402 can determine that many (e.g., dozens or hundreds of) downstream products 410 depend on the updated software package 102.

In block 504, based on determining that the downstream product 410 depends on the updated software package 102, the processor 402 initiates a first rebuild process 122a on the downstream product 410 (e.g., its source code) using the updated software package 102. This may involve transmitting one or more commands to a build tool that controls the first rebuild process 122a.

In block 506, the processor 402 detects that the first rebuild process 122a failed. This may involve analyzing a report 126a generated based on the first rebuild process 122a, where the report 126a indicates whether tests 124a performed during the first rebuild process 122a succeeded or failed.

In block 508, in response to detecting that the first rebuild process 122a failed, the processor 402 initiates a second rebuild process 122b on the downstream product 410 using a prior version of the updated software package 120 that excludes at least one update 408 made in the updated software package 102. This may involve transmitting one or more commands to a build tool that controls the second rebuild process 122b.

In block 510, the processor 402 detects that the second rebuild process 122b succeeded. This may involve analyzing a report 126b generated based on the second rebuild process 122b, where the report 126b indicates whether tests 124b performed during the second rebuild process 122b succeeded or failed.

In block 512, based on detecting that the first rebuild process 122a failed and the second rebuild process 122b succeeded, the processor 402 generates an output 128 for a user 412 indicating that the updated software package 102 is flawed. The processor 402 can then transmit the output 128 to the user 412, who may take any suitable corrective action to resolve the flaw.

Some aspects of the present disclosure can be implemented according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by one or more processors for causing the one or more processors to: determine that a downstream product depends on an updated software package; based on determining that the downstream product depends on the updated software package, initiate a first rebuild process on the downstream product using the updated software package; detect that the first rebuild process failed; in response to detecting that the first rebuild process failed, initiate a second rebuild process on the downstream product using a prior version of the updated software package that excludes at least one update made in the updated software package; detect that the second rebuild process succeeded; and based on detecting that the first rebuild process failed and the second rebuild process succeeded, generate an output for a user indicating that the updated software package is flawed.

Example #2: The non-transitory computer-readable medium of Example #1, further comprising program code that is executable by the one or more processors for causing the one or more processors to: determine that a plurality of downstream products depend on the updated software package; based on determining that the plurality of downstream products depend on the updated software package, execute a respective rebuild process with respect to each downstream product of the plurality of downstream products using the updated software package; and generate a list of downstream products that failed their respective rebuild process.

Example #3: The non-transitory computer-readable medium of Example #2, further comprising program code that is executable by the one or more processors for causing the one or more processors to: for each respective downstream product in the list of downstream products that failed their respective rebuild process: execute another rebuild process on the respective downstream product using the prior version of the updated software package; determine whether the other rebuild process succeeded or failed; and in response to determining that the other rebuild process succeeded, generate a respective output to indicate that the updated software package is flawed; or in response to determining that the other rebuild process failed, generate the respective output to indicate that a failure reason could not be identified.

Example #4: The non-transitory computer-readable medium of any of Examples #2-3, further comprising program code that is executable by the one or more processors for causing the one or more processors to: determine a sequence in which to rebuild the plurality of downstream products; and execute the respective rebuild process on each downstream product of the plurality of downstream products in accordance with the sequence.

Example #5: The non-transitory computer-readable medium of Example #4, further comprising program code that is executable by the one or more processors for causing the one or more processors to: determine the sequence based on a predefined file, the predefined file specifying the sequence.

Example #6: The non-transitory computer-readable medium of any of Examples #2-5, further comprising program code that is executable by the one or more processors for causing the one or more processors to: determine that the plurality of downstream products depend on the updated software package based on a predefined file, the predefined file specifying the plurality of downstream products.

Example #7: The non-transitory computer-readable medium of any of Examples #2-5, further comprising program code that is executable by the one or more processors for causing the one or more processors to: transmit a request to a package handler for a list of downstream products that depend on the updated software package, wherein the package handler is configured to return the list of downstream products in response to the request; generate a filtered list of downstream products by filtering out duplicate software packages from the list of downstream products; determine a latest version of each software package on the filtered list of downstream products; determine a corresponding commit hash for the latest version of each software package on the filtered list of downstream products; obtain corresponding source code for the latest version of each software package on the filtered list of downstream products using the corresponding commit hash; and execute the respective rebuild process with respect to each downstream product on the filtered list of downstream products using the corresponding source code.

Example #8: The non-transitory computer-readable medium of any of Examples #1-7, wherein the first rebuild process involves a plurality of software tests, and further comprising program code that is executable by the one or more processors for causing the one or more processors to: determine that the first rebuild process failed based on a failure of at least one software test of the plurality of software tests.

Example #9: A method comprising: determining, by one or more processors, that a downstream product depends on an updated software package; based on determining that the downstream product depends on the updated software package, initiating, by the one or more processors, a first rebuild process on the downstream product using the updated software package; detecting, by the one or more processors, that the first rebuild process failed; in response to detecting that the first rebuild process failed, initiating, by the one or more processors, a second rebuild process on the downstream product using a prior version of the updated software package that excludes at least one update made in the updated software package; detecting, by the one or more processors, that the second rebuild process succeeded; and based on detecting that the first rebuild process failed and the second rebuild process succeeded, generating, by the one or more processors, an output for a user indicating that the updated software package is flawed.

Example #10: The method of Example #9, further comprising: determining that a plurality of downstream products depend on the updated software package; based on determining that the plurality of downstream products depend on the updated software package, executing a respective rebuild process with respect to each downstream product of the plurality of downstream products using the updated software package; and generating a list of downstream products that failed their respective rebuild process.

Example #11: The method of Example #10, further comprising: for each respective downstream product in the list of downstream products that failed their respective rebuild process: executing another rebuild process on the respective downstream product using the prior version of the updated software package; determining whether the other rebuild process succeeded or failed; and in response to determining that the other rebuild process succeeded, generating a respective output to indicate that the updated software package is flawed; or in response to determining that the other rebuild process failed: generating the respective output to indicate that a failure reason could not be identified; and providing build logs or tests logs, generated during the other rebuild process, to the user for helping the user identify an origin of the failure.

Example #12: The method of any of Examples #10-11, further comprising: determining a sequence in which to rebuild the plurality of downstream products; and executing the respective rebuild process on each downstream product of the plurality of downstream products in accordance with the sequence.

Example #13: The method of Example #12, further comprising determining the sequence based on a predefined file, the predefined file specifying the sequence.

Example #14: The method of any of Examples #10-13, further comprising determining that the plurality of downstream products depend on the updated software package based on a predefined file, the predefined file specifying the plurality of downstream products.

Example #15: The method of any of Examples #10-13, further comprising: transmitting a request to a package handler for a list of downstream products that depend on the updated software package, wherein the package handler is configured to return the list of downstream products in response to the request; generating a filtered list of downstream products by filtering out duplicate software packages from the list of downstream products; determining a latest version of each software package on the filtered list of downstream products; determining a corresponding commit hash for the latest version of each software package on the filtered list of downstream products; obtaining corresponding source code for the latest version of each software package on the filtered list of downstream products using the corresponding commit hash; and executing the respective rebuild process with respect to each downstream product on the filtered list of downstream products using the corresponding source code.

Example #16: The method of any of Examples #9-15, wherein the first rebuild process involves a plurality of software tests, and further comprising determining that the first rebuild process failed based on a failure of at least one software test of the plurality of software tests.

Example #17: A system comprising: one or more processors; and one or more memories including instructions that are executable by the one or more processors for causing the one or more processors to: determine that a downstream product depends on an updated software package; based on determining that the downstream product depends on the updated software package, initiate a first rebuild process on the downstream product using the updated software package; detect that the first rebuild process failed; in response to detecting that the first rebuild process failed, initiate a second rebuild process on the downstream product using a prior version of the updated software package that excludes at least one update made in the updated software package; detect that the second rebuild process succeeded; and based on detecting that the first rebuild process failed and the second rebuild process succeeded, generate an output for a user indicating that the updated software package is flawed.

Example #18: The system of Example #17, wherein the one or more memories further include instructions that are executable by the one or more processors for causing the one or more processors to: determine that a plurality of downstream products depend on the updated software package; based on determining that the plurality of downstream products depend on the updated software package, execute a respective rebuild process with respect to each downstream product of the plurality of downstream products using the updated software package; and generate a list of downstream products that failed their respective rebuild process.

Example #19: The system of Example #18, wherein the one or more memories further include instructions that are executable by the one or more processors for causing the one or more processors to: for each respective downstream product in the list of downstream products that failed their respective rebuild process: execute another rebuild process on the respective downstream product using the prior version of the updated software package; determine whether the other rebuild process succeeded or failed; and in response to determining that the other rebuild process succeeded, generate a respective output to indicate that the updated software package is flawed; or in response to determining that the other rebuild process failed, generate the respective output to indicate that a failure reason could not be identified.

Example #20: The system of any of Examples #17-19, wherein the one or more memories further include instructions that are executable by the one or more processors for causing the one or more processors to: transmit a request to a package handler for a list of downstream products that depend on the updated software package, wherein the package handler is configured to return the list of downstream products in response to the request; generate a filtered list of downstream products by filtering out duplicate software packages from the list of downstream products; determine a latest version of each software package on the filtered list of downstream products; determine a corresponding commit hash for the latest version of each software package on the filtered list of downstream products; obtain corresponding source code for the latest version of each software package on the filtered list of downstream products using the corresponding commit hash; and execute the respective rebuild process with respect to each downstream product on the filtered list of downstream products using the corresponding source code.

Example #21: A non-transitory computer-readable medium comprising program code that is executable by one or more processors for causing the one or more processors to: determine that a plurality of downstream products depend on an updated software package; and for each respective downstream product of the plurality of downstream products: initiate a first rebuild process with respect to the respective downstream product using the updated software package; determine whether the first rebuild process failed; and in response to determining that the first rebuild process failed: initiate a second rebuild process on the respective downstream product using a prior version of the updated software package; determine whether the second rebuild process failed; and in response to determining that the second rebuild process succeeded, generate a respective output indicating that the updated software package is flawed.

Example #22: The non-transitory computer-readable medium of Example #21, further comprising program code that is executable by the one or more processors for causing the one or more processors to: determine a predefined sequence in which to rebuild the plurality of downstream products; and execute the first rebuild process on each downstream product of the plurality of downstream products in accordance with the predefined sequence.

Example #23: The non-transitory computer-readable medium of Example #22, further comprising program code that is executable by the one or more processors for causing the one or more processors to: determine the predefined sequence based on a predefined file, the predefined file specifying the predefined sequence.

Example #24: The non-transitory computer-readable medium of Example #21-23, wherein the first rebuild process involves a plurality of software tests, and further comprising program code that is executable by the one or more processors for causing the one or more processors to: determine that the first rebuild process failed based on a failure of at least one software test of the plurality of software tests.

Example #25: The non-transitory computer-readable medium of Example #24, wherein the respective output indicates the respective downstream product that failed the first rebuild process, and wherein the respective output indicates the at least one software test that was failed by the respective downstream product during the first rebuild process.

Example #26: A method comprising: determining, by one or more processors, that a plurality of downstream products depend on an updated software package; and for each respective downstream product of the plurality of downstream products: initiating, by the one or more processors, a first rebuild process with respect to the respective downstream product using the updated software package; determining, by the one or more processors, whether the first rebuild process failed; and in response to determining that the first rebuild process failed: initiating, by the one or more processors, a second rebuild process on the respective downstream product using a prior version of the updated software package; determining, by the one or more processors, whether the second rebuild process failed; and in response to determining that the second rebuild process succeeded, generating, by the one or more processors, a respective output indicating that the updated software package is flawed.

Example #27: The method of Example #26, further comprising: determining a predefined sequence in which to rebuild the plurality of downstream products; and executing the first rebuild process on each downstream product of the plurality of downstream products in accordance with the predefined sequence.

Example #28: The method of Example #27, further comprising: determine the predefined sequence based on a predefined file, the predefined file specifying the predefined sequence.

Example #29: The method of any of Examples #26-28, wherein the first rebuild process involves a plurality of software tests, and further comprising: determining that the first rebuild process failed based on a failure of at least one software test of the plurality of software tests.

Example #30: The method of Example #29, wherein the respective output indicates the respective downstream product that failed the first rebuild process, and wherein the respective output indicates the at least one software test that was failed by the respective downstream product during the first rebuild process.

Example #31: A system comprising: one or more processors; and one or more memories including instructions that are executable by the one or more processors for causing the one or more processors to: determine that a plurality of downstream products depend on an updated software package; and for each respective downstream product of the plurality of downstream products: initiate a first rebuild process with respect to the respective downstream product using the updated software package; determine whether the first rebuild process failed; and in response to determining that the first rebuild process failed: initiate a second rebuild process on the respective downstream product using a prior version of the updated software package; determine whether the second rebuild process failed; and in response to determining that the second rebuild process succeeded, generate a respective output indicating that the updated software package is flawed.

Example #32: The system of Example #31, wherein the one or more memories further include instructions that are executable by the one or more processors for causing the one or more processors to: determine a predefined sequence in which to rebuild the plurality of downstream products; and execute the first rebuild process on each downstream product of the plurality of downstream products in accordance with the predefined sequence.

Example #33: The system of Example #32, wherein the one or more memories further include instructions that are executable by the one or more processors for causing the one or more processors to: determine the predefined sequence based on a predefined file, the predefined file specifying the predefined sequence.

Example #34: The system of any of Examples #31-33, wherein the first rebuild process involves a plurality of software tests, and wherein the one or more memories further include instructions that are executable by the one or more processors for causing the one or more processors to: determine that the first rebuild process failed based on a failure of at least one software test of the plurality of software tests.

Example #35: The system of Example #34, wherein the respective output indicates the respective downstream product that failed the first rebuild process, and wherein the respective output indicates the at least one software test that was failed by the respective downstream product during the first rebuild process.

Example #36: A system comprising: means for determining that a plurality of downstream products depend on an updated software package; and means for, for each respective downstream product of the plurality of downstream products: initiating a first rebuild process with respect to the respective downstream product using the updated software package; determining whether the first rebuild process failed; and in response to determining that the first rebuild process failed: initiating a second rebuild process on the respective downstream product using a prior version of the updated software package; determining whether the second rebuild process failed; and in response to determining that the second rebuild process succeeded, generating a respective output indicating that the updated software package is flawed.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by one or more processors for causing the one or more processors to:
   determine that a downstream product depends on an updated software package;
   based on determining that the downstream product depends on the updated software package, initiate a first rebuild process on the downstream product using the updated software package;
   detect that the first rebuild process failed;
   in response to detecting that the first rebuild process failed, initiate a second rebuild process on the downstream product using a prior version of the updated software package that excludes at least one update made in the updated software package;
   detect that the second rebuild process succeeded; and
   based on detecting that the first rebuild process failed and the second rebuild process succeeded, generate an output for a user indicating that the updated software package is flawed.

2. The non-transitory computer-readable medium of claim 1, further comprising program code that is executable by the one or more processors for causing the one or more processors to:
   determine that a plurality of downstream products depend on the updated software package;
   based on determining that the plurality of downstream products depend on the updated software package, execute a respective rebuild process with respect to each downstream product of the plurality of downstream products using the updated software package; and
   generate a list of downstream products that failed their respective rebuild process.

3. The non-transitory computer-readable medium of claim 2, further comprising program code that is executable by the one or more processors for causing the one or more processors to:
   for each respective downstream product in the list of downstream products that failed their respective rebuild process:
      execute another rebuild process on the respective downstream product using the prior version of the updated software package;
      determine whether the other rebuild process succeeded or failed; and
      in response to determining that the other rebuild process succeeded, generate a respective output to indicate that the updated software package is flawed; or
      in response to determining that the other rebuild process failed, generate the respective output to indicate that a failure reason could not be identified.

4. The non-transitory computer-readable medium of claim 2, further comprising program code that is executable by the one or more processors for causing the one or more processors to:
   determine a sequence in which to rebuild the plurality of downstream products; and
   execute the respective rebuild process on each downstream product of the plurality of downstream products in accordance with the sequence.

5. The non-transitory computer-readable medium of claim 4, further comprising program code that is executable by the one or more processors for causing the one or more processors to:
 determine the sequence based on a predefined file, the predefined file specifying the sequence.

6. The non-transitory computer-readable medium of claim 2, further comprising program code that is executable by the one or more processors for causing the one or more processors to:
 determine that the plurality of downstream products depend on the updated software package based on a predefined file, the predefined file specifying the plurality of downstream products.

7. The non-transitory computer-readable medium of claim 2, further comprising program code that is executable by the one or more processors for causing the one or more processors to:
 transmit a request to a package handler for a list of downstream products that depend on the updated software package, wherein the package handler is configured to return the list of downstream products in response to the request;
 generate a filtered list of downstream products by filtering out duplicate software packages from the list of downstream products;
 determine a latest version of each software package on the filtered list of downstream products;
 determine a corresponding commit hash for the latest version of each software package on the filtered list of downstream products;
 obtain corresponding source code for the latest version of each software package on the filtered list of downstream products using the corresponding commit hash; and
 execute the respective rebuild process with respect to each downstream product on the filtered list of downstream products using the corresponding source code.

8. The non-transitory computer-readable medium of claim 1, wherein the first rebuild process involves a plurality of software tests, and further comprising program code that is executable by the one or more processors for causing the one or more processors to:
 determine that the first rebuild process failed based on a failure of at least one software test of the plurality of software tests.

9. A method comprising:
 determining, by one or more processors, that a downstream product depends on an updated software package;
 based on determining that the downstream product depends on the updated software package, initiating, by the one or more processors, a first rebuild process on the downstream product using the updated software package;
 detecting, by the one or more processors, that the first rebuild process failed;
 in response to detecting that the first rebuild process failed, initiating, by the one or more processors, a second rebuild process on the downstream product using a prior version of the updated software package that excludes at least one update made in the updated software package;
 detecting, by the one or more processors, that the second rebuild process succeeded; and
 based on detecting that the first rebuild process failed and the second rebuild process succeeded, generating, by the one or more processors, an output for a user indicating that the updated software package is flawed.

10. The method of claim 9, further comprising:
 determining that a plurality of downstream products depend on the updated software package;
 based on determining that the plurality of downstream products depend on the updated software package, executing a respective rebuild process with respect to each downstream product of the plurality of downstream products using the updated software package; and
 generating a list of downstream products that failed their respective rebuild process.

11. The method of claim 10, further comprising:
 for each respective downstream product in the list of downstream products that failed their respective rebuild process:
  executing another rebuild process on the respective downstream product using the prior version of the updated software package;
  determining whether the other rebuild process succeeded or failed; and
  in response to determining that the other rebuild process succeeded, generating a respective output to indicate that the updated software package is flawed; or
  in response to determining that the other rebuild process failed:
   generating the respective output to indicate that a failure reason could not be identified; and
   providing build logs or tests logs, generated during the other rebuild process, to the user for helping the user identify an origin of the failure.

12. The method of claim 10, further comprising:
 determining a sequence in which to rebuild the plurality of downstream products; and
 executing the respective rebuild process on each downstream product of the plurality of downstream products in accordance with the sequence.

13. The method of claim 12, further comprising:
 determining the sequence based on a predefined file, the predefined file specifying the sequence.

14. The method of claim 10, further comprising:
 determining that the plurality of downstream products depend on the updated software package based on a predefined file, the predefined file specifying the plurality of downstream products.

15. The method of claim 10, further comprising:
 transmitting a request to a package handler for a list of downstream products that depend on the updated software package, wherein the package handler is configured to return the list of downstream products in response to the request;
 generating a filtered list of downstream products by filtering out duplicate software packages from the list of downstream products;
 determining a latest version of each software package on the filtered list of downstream products;
 determining a corresponding commit hash for the latest version of each software package on the filtered list of downstream products;
 obtaining corresponding source code for the latest version of each software package on the filtered list of downstream products using the corresponding commit hash; and executing the respective rebuild process with respect to each downstream product on the filtered list of downstream products using the corresponding source code.

16. The method of claim 9, wherein the first rebuild process involves a plurality of software tests, and further comprising:
    determining that the first rebuild process failed based on a failure of at least one software test of the plurality of software tests.

17. A system comprising:
    one or more processors; and
    one or more memories including instructions that are executable by the one or more processors for causing the one or more processors to:
        determine that a downstream product depends on an updated software package;
        based on determining that the downstream product depends on the updated software package, initiate a first rebuild process on the downstream product using the updated software package;
        detect that the first rebuild process failed;
        in response to detecting that the first rebuild process failed, initiate a second rebuild process on the downstream product using a prior version of the updated software package that excludes at least one update made in the updated software package;
        detect that the second rebuild process succeeded; and
        based on detecting that the first rebuild process failed and the second rebuild process succeeded, generate an output for a user indicating that the updated software package is flawed.

18. The system of claim 17, wherein the one or more memories further include instructions that are executable by the one or more processors for causing the one or more processors to:
    determine that a plurality of downstream products depend on the updated software package;
    based on determining that the plurality of downstream products depend on the updated software package, execute a respective rebuild process with respect to each downstream product of the plurality of downstream products using the updated software package; and
    generate a list of downstream products that failed their respective rebuild process.

19. The system of claim 18, wherein the one or more memories further include instructions that are executable by the one or more processors for causing the one or more processors to:
    for each respective downstream product in the list of downstream products that failed their respective rebuild process:
        execute another rebuild process on the respective downstream product using the prior version of the updated software package;
        determine whether the other rebuild process succeeded or failed; and
        in response to determining that the other rebuild process succeeded, generate a respective output to indicate that the updated software package is flawed; or
        in response to determining that the other rebuild process failed, generate the respective output to indicate that a failure reason could not be identified.

20. The system of claim 17, wherein the one or more memories further include instructions that are executable by the one or more processors for causing the one or more processors to:
    transmit a request to a package handler for a list of downstream products that depend on the updated software package, wherein the package handler is configured to return the list of downstream products in response to the request;
    generate a filtered list of downstream products by filtering out duplicate software packages from the list of downstream products;
    determine a latest version of each software package on the filtered list of downstream products;
    determine a corresponding commit hash for the latest version of each software package on the filtered list of downstream products;
    obtain corresponding source code for the latest version of each software package on the filtered list of downstream products using the corresponding commit hash; and
    execute the respective rebuild process with respect to each downstream product on the filtered list of downstream products using the corresponding source code.

\* \* \* \* \*